(12) United States Patent
Czuchry, Sr. et al.

(10) Patent No.: US 6,791,541 B1
(45) Date of Patent: Sep. 14, 2004

(54) THREE-DIMENSIONAL IMAGE SYSTEM (75) Inventors: Andrew J. Czuchry, Sr., Gray, TN (US); Andrew J. Czuchry, Jr., Auburn, GA (US); Robert A. Wimberly, Milligan College, TN (US); Ronald L. Jacobs, Jr., Gray, TN (US)

(73) Assignee: Microporous Products, L.P., Piney Flats, TN (US)

(*) Notice: Subject to any disclaimer, the term of this patent is extended or adjusted under 35 U.S.C. 154(b) by 116 days.

(21) Appl. No.: 10/260,968

(22) Filed: Sep. 30, 2002

Related U.S. Application Data (63) Continuation-in-part of application No. 10/193,426, filed on Jul. 11, 2002, now Pat. No. 6,741,244.

(51) Int. Cl.[7] ............................................. G06T 15/00
(52) U.S. Cl. ...................................... 345/419; 359/619
(58) Field of Search ................................ 345/204, 419, 345/441, 698; 359/619, 620, 628; 348/40, 545

(56) References Cited

U.S. PATENT DOCUMENTS

| | | | |
|---|---|---|---|
| 1,128,979 A | 2/1915 | Hess | |
| 1,918,705 A | 7/1933 | Ives | |
| 5,099,320 A | 3/1992 | Allio | |
| 5,715,383 A | * | 2/1998 | Schindler et al. ........... 345/419 |
| 5,828,380 A | * | 10/1998 | Lin ............................. 345/441 |
| 6,064,424 A | 5/2000 | van Berkel et al. | |
| 6,069,650 A | 5/2000 | Battersby | |
| 6,118,584 A | 9/2000 | van Berkel et al. | |
| 6,124,850 A | * | 9/2000 | Matsubara .................. 345/204 |
| 6,373,963 B1 | 4/2002 | Demers et al. | |
| 6,373,970 B1 | 4/2002 | Dong et al. | |
| 6,490,093 B2 | * | 12/2002 | Guest .......................... 359/619 |

FOREIGN PATENT DOCUMENTS

WO  WO 02/17646 A1  2/2002

OTHER PUBLICATIONS

Phillips Research, Technical Information on 3D–LCD, Copyright 2002.

\* cited by examiner

*Primary Examiner*—Mark Zimmerman
*Assistant Examiner*—Lance W. Sealey
(74) *Attorney, Agent, or Firm*—Luedeka, Neely & Graham PC

(57) ABSTRACT

A method and apparatus for providing three-dimensional images of one or more objects. The apparatus includes a base substrate, an image layer on said substrate, and a lenticular material superposed on the image layer. The image layer is provided by an imaging tool configured for depositing pixels on the substrate from contour corrected pixel data such that the deposited pixels have a structural contour relationship to the one or more objects. The imaging tool manipulates the pixel data to be compatible with the substrate and lenticular material. The method provides substantially improved three-dimensional images and devices containing improved three-dimensional images.

24 Claims, 6 Drawing Sheets

THREE-DIMENSIONAL IMAGE SYSTEM

This application is a continuation in part of Ser. No. 10/193,426 filed Jul. 11, 2002 now U.S. Pat. No. 6,741,244.

FIELD OF THE INVENTION

The invention relates to a three-dimensional image system and to methods for producing improved three-dimensional images using an integrated system incorporating imaging tools, viewing devices, and image properties.

BACKGROUND

Image processing and three-dimensional imagery are applicable to a wide variety of applications including entertainment, medical, scientific investigations, and the like. One problem with the current state of the art of image processing is that it often fails to provide realistic three-dimensional images using inexpensive imaging devices such as cathode ray tubes (CRT's), liquid crystal displays (LCD's), lenticular devices, and laser or ink jet printers. In conventional image processing techniques, redundant image information is combined to provide a simulated three-dimensional image suitable for display by a two-dimensional display device. The appearance of depth in such images is provided by combining multiple segments of planar image data. The actual contour and orientation of the image is often ignored or severely distorted within some or all of the segments. Accordingly, the further the segment of image data is from the ideal focal point, the less sharp the image. Many conventional three-dimensional imaging techniques are thus based on combining two or more offset planar images, with inherent imaging distortions, to provide a simulation of depth as perceived by the human eye.

There continues to be a need for a method and apparatus for providing realistic three-dimensional images without the need for elaborate or costly imaging devices. There is also a need for an image processing technique which more closely approximates image perception experienced by the human eye without the need for multiple image input devices. Furthermore, there is a need for an integrated system that provides improvement in image quality or information content by independently manipulating one or more components of the system.

SUMMARY OF THE INVENTION

In one embodiment, with regard to the foregoing and other needs, the invention provides a method producing three-dimensional images. The method includes the steps of:

providing a digital image file from a digital image source of one or more objects, the digital image file containing pixel data for pixels having a structural contour relationship to the one or more objects;

converting the pixels to contour corrected pixels to provide a contoured image file;

building an output image file from the contoured image file;

selecting a printed image format, ink composition, lenticular material, and substrate for the contoured image file, wherein the printed image format provides pixel placement on the substrate for a three-dimensional image viewable through the lenticular material;

printing the three-dimensional image on the substrate to provide an image layer on the substrate; and attaching the lenticular material to image layer on the substrate to provide a three-dimensional image.

In another embodiment, the invention includes a three-dimensional image device for providing a three-dimensional image of one or more objects. The device includes:

a base substrate;

an image layer on said substrate; and a lenticular material superposed on the image layer, wherein the image layer is provided by an imaging tool configured for depositing pixels on the substrate from contour corrected pixel data such that the deposited pixels have a structural contour relationship to the one or more objects, and wherein the image layer is manipulated by the imaging tool to be compatible with the substrate and lenticular material.

Advantages of the invention include the ability to provide more realistic three-dimensional images of one or more objects on a variety of output devices in a cost effective manner. The images may be corrected for any desired image resolution. The imaging tool used by the method and apparatus of the invention enables closer correlation between the contours of the image and the pixel positions of the image on the output device. For example, conventional three-dimensional imaging techniques provide redundant overlapping planar images to give the perception of depth. However, planar images do not include sufficient contour parameters to provide realistic depth perception of the images. The present invention solves the problem by providing pixel by pixel correction based on pixel position and depth or distance from an ideal focal point to provide image interpolation while substantially decreasing redundant image data points. The three-dimensional images provided by the invention are significantly clearer or sharper than images provided by conventional imaging techniques.

Another advantage of the invention is that each of the components of the image system may be, selectively manipulated to provide an enhanced three-dimensional image. For example, the lenticular material thickness and properties may be selected to reduce the cost of the three-dimensional image system. Likewise, ink compositions may be manipulated by the system to be compatible with the lenticular material and substrate so that the three-dimensional image has improved characteristics such as sharpness and realism. The ink composition and lenticular material may also be manipulated with the image properties to provide other effects such as phase shifts, polarization, image encryption, and the like.

BRIEF DESCRIPTION OF THE DRAWINGS

Further advantages of the invention will become apparent by reference to the detailed description when considered in conjunction with the figures, wherein like reference numbers indicate like elements throughout, and wherein.

DETAILED DESCRIPTION OF THE INVENTION

Figures 1, 9:
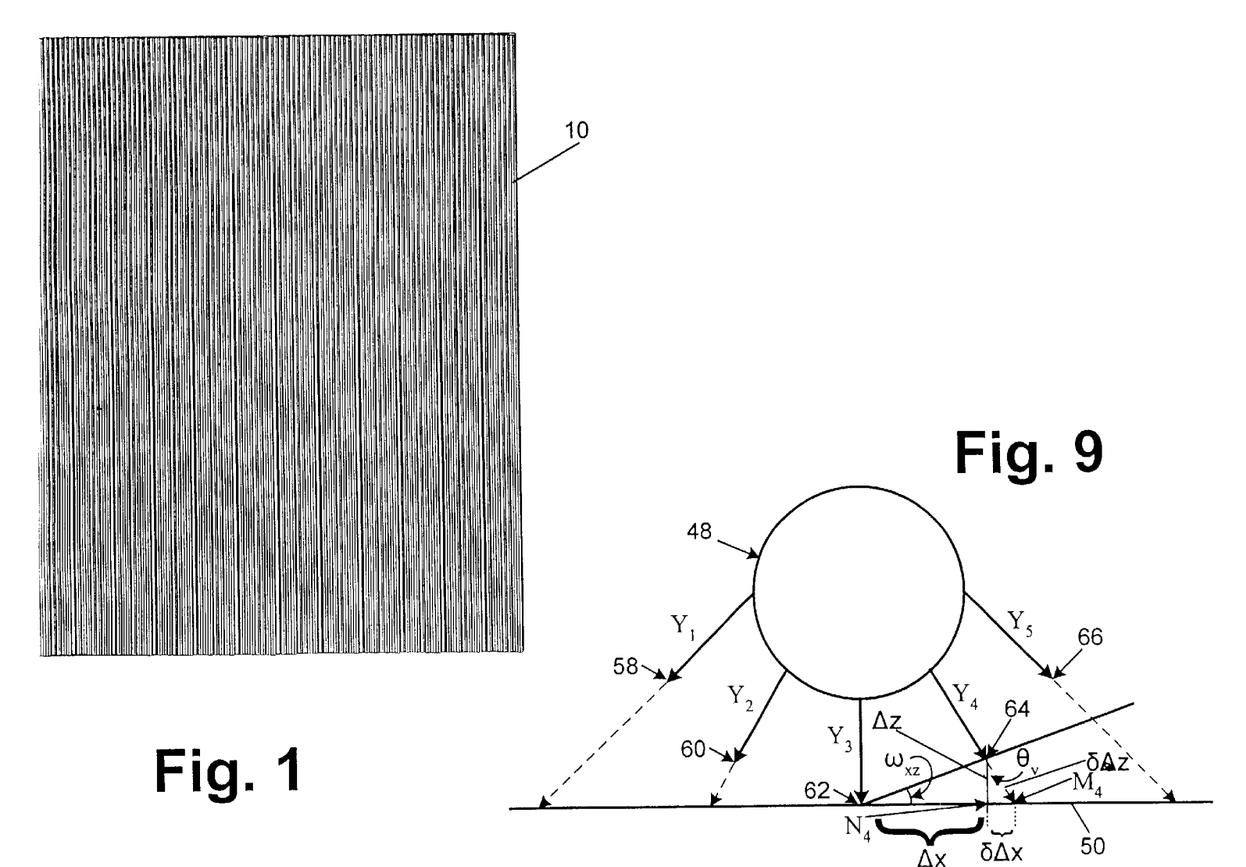
FIG. 1 is a plan view, not to scale, of a portion of lenticular material for the image system and devices according to the invention.
FIG. 9 is a schematic illustration of a method for calculating ideal image data locations for one or more three-dimensional objects to provide a perception of depth on a two dimensional image device.

With reference to FIG. 1, the invention incorporates lenticular material 10 into a wide variety of devices or systems to provide a three-dimensional image. Such devices and systems include video display monitors, print media, and the like. The lenticular material 10 is preferably substantially transparent and may be provided by a thermoset or thermoplastic material selected from the group consisting of polycarbonate, polyester, polyethylene, polypropylene, polystyrene, polyethylene terephthalate, modified copolymers of polyethylene terephthalate, and the like. A particular preferred material is polypropylene.

The material used for the lenticular material 10 may be molded or machined to provide a plurality of lenticules therein. When combined with a three-dimensional image, the lenticular material 10 separates the three-dimensional image into stereoscopic pairs or pseudo-stereoscopic pairs. The term "pseudo-stereoscopic pairs" means pairs of images that are not completely separated into a stereographic image due to the particular optical properties of the lenticular material, the distance of a viewer's eyes from the lenticular material, and the viewer's eye movements when viewing the image. The stereoscopic pairs and pseudo-stereoscopic pairs are perceived by the left and right eyes of a person giving the impression of depth to the three-dimensional image.

Figures 2, 3, 4:
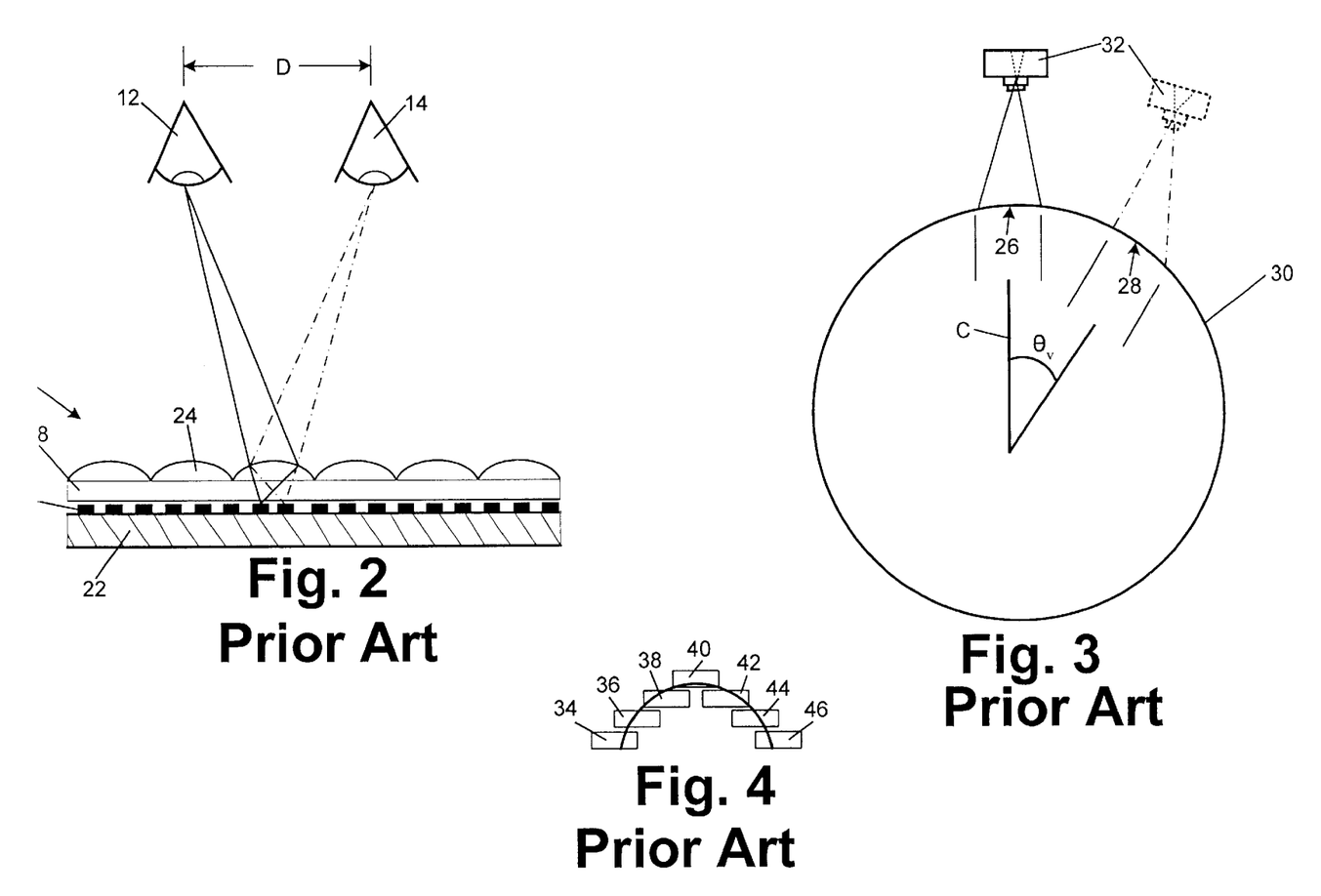
FIG. 2 is a cross-sectional view, not to scale, of a conventional three-dimensional image device.
FIG. 3 is a conventional method for capturing multiple images of an object for display on a three-dimensional image device.
FIG. 4 is a schematic representation of multiple overlapping images for providing a three-dimensional image of an object.

As shown in FIG. 2, a center to center distance D exists between a person's left and right eyes 12 and 14. Accordingly, when viewing an object directly in front of the person, each eye 12 and 14 sees a slightly different or offset portion of the object. Lenticular viewing systems 16 use the distance D between eyes 12 and 14 and offset sets of images viewed through a lenticular lens material 18 to give the image 20 a perception of depth even though the image 20 is disposed on a two-dimensional substrate 22. The lenticules 24 of the lenticular lens material 18 focus a portion of the image 20 for viewing by each eye 12 and 14. The lenticular viewing system 16 illustrated in FIG. 2 is greatly enlarged for ease of illustration. However, it will be recognized that the lenticules 24 of the system 16 are typically extremely small and spaced close together so that the lenticules 24 provide individual offset images for each eye 12 and 14.

As explained in more detail below, the invention enables independent manipulation of the properties of the lenticular material 10, ink composition, image, and substrate to provide unique systems. Specifically, properties of the lenticular material 10 such as lenticular frequency, lenticule view angle, lenticule shape, lenticule orientation, focal plane, material translucence, and visual spectrum aberrations for varying wavelengths may be selectively manipulated by the invention to provide enhanced three-dimensional images. For example, the lenticular material 10 may be provided by a polymeric web containing one or more polyelectrolyte layers. The polyelectrolyte layers may include oppositely charged polymers to provide desired optical properties for a variety of applications including encryption of the images for authenticity verification upon applying a potential to the lenticular material 10. Polyelectrolyte layers may be provided by sequentially immersing the polymeric web in various electrolyte solutions. In the alternative, functional polymers may be directly stamped onto the surface of web. For example, a polyanion may be stamped directly onto a charged polycation layer on the surface of a polyelectrolyte layer to provide multiple polyelectrolyte layers having opposite charges.

Additionally, the polymeric web may include polyelectrolyte layers containing nanoparticles. The nanoparticles may include semiconductors, metals, metal oxides, and the like, which provide distinctive optical, magnetic, and/or electrical properties to the polymeric web. For example, highly luminescent cadmium tellurium (CdTe) nanoparticles stabilized by thioglycolic acid combined with a polyelectrolyte such as poly(diallyldimethylammonium chloride) can provide polyelectrolyte layers on the polymeric web that emit light of different colors upon activation by an appropriate stimulant such as pH or an electric field. Silver nanoparticles in the polyelectrolyte layer can be used to change the optical properties of the polymeric web. The ability to selectively manipulate the lenticular material 10 to provide desired properties compatible with an improved image is thus one of the benefits and advantages of the invention.

The invention also enables use of a wide variety of images 20 and manipulation of the images 20 on the substrate 22 to provide desirable properties. For example, the images 20 may be manipulated to provide desirable position, color, curvature, orientation, depth, focal point, scene lighting, and/or translucence properties.

The image 20 applied to the substrate 22 may be provided by a variety of techniques and imaging devices. As shown in FIG. 3, multiples image segments such as image segments 26 and 28 of an object or objects 30 may be captured, for example, by one or more cameras 32. The image segments 26 and 28 are preferably slightly offset from one another so that multiple image segments such as image segments 34, 36, 38, 40, 42, 44, and 46 may be combined and overlapped as shown in FIG. 4 to provide the image for viewing in the lenticular viewing system 16. For any object 30 other than a two-dimensional object, the position of each image segment may be characterized is by its view angle ($\theta_v$) relative to a reference line C. As a camera 32 moves around the object 30 in a clockwise direction and captures segments of the object, the view angle ($\theta_v$) changes from an initial view angle ($\theta_0$) of zero degrees with respect to reference line C for image segment 26 to view angle ($\theta_v$) for image segment 28. In order to provide continuity of the image, the image segments preferably overlap so that when combined as in FIG. 4, a complete image of the object 30 is provided.

It is evident from FIG. 4 that multiple redundant image segments 34–46, etc. are required to be combined to provide a complete image. It is also evident that the image segments 34–46 are two-dimensional slices of the object 30. Hence, each segment 34–46 has only planar components. A two-dimensional object, having only planar components can be reproduced readily with little distortion of the image. The image segments of three-dimensional objects such as object 30, however may be distorted when the segments 34–46 are overlapped on a two dimensional substrate 22 as shown in FIG. 2.

The invention improves the image viewed through a lenticular material by providing an image based on pixel data rather than two-dimensional image segments. The pixel data is manipulated in a unique way to provide sharper, more realistic three-dimensional images of an object or objects when viewed through a lenticular material. For the purposes of simplicity, the aspects of the invention will be described with respect to the image of a single object. However, the invention is adaptable to an image or images of multiple objects. As set forth above, the lenticular material 10 may be modified by the invention to provide an image system with unique properties. However, it will be evident from the following discussion that modification of the lenticular material 10 in combination with image 20 integration with the lenticular material 10 is designed to provide superior results as compared to modifying the lentidular material 10 alone.

Figure 5:
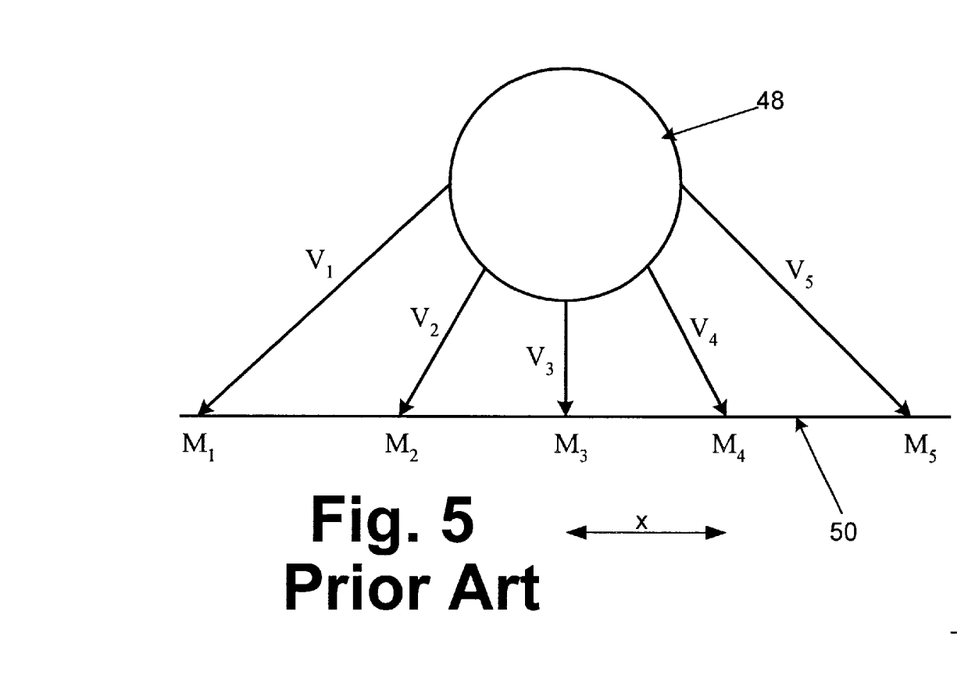
FIG. 5 is a schematic illustration of the projection of image data for one or more three-dimensional objects on a planar surface.
Figure 6:
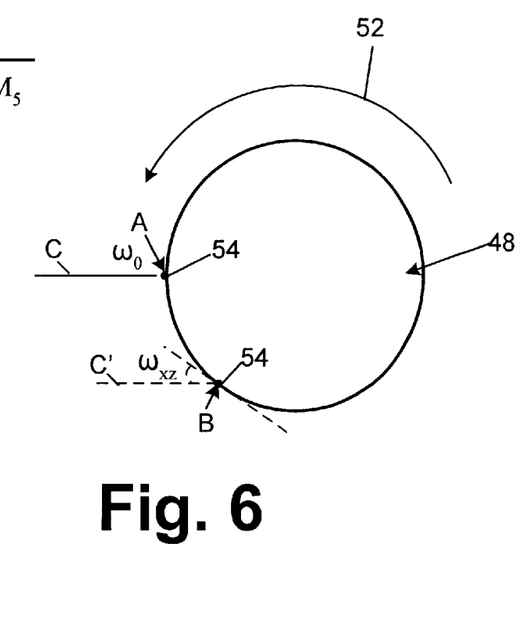
FIG. 6 is a schematic illustration of how the invention provides pixels in a data file for one or more objects.
Figure 7:
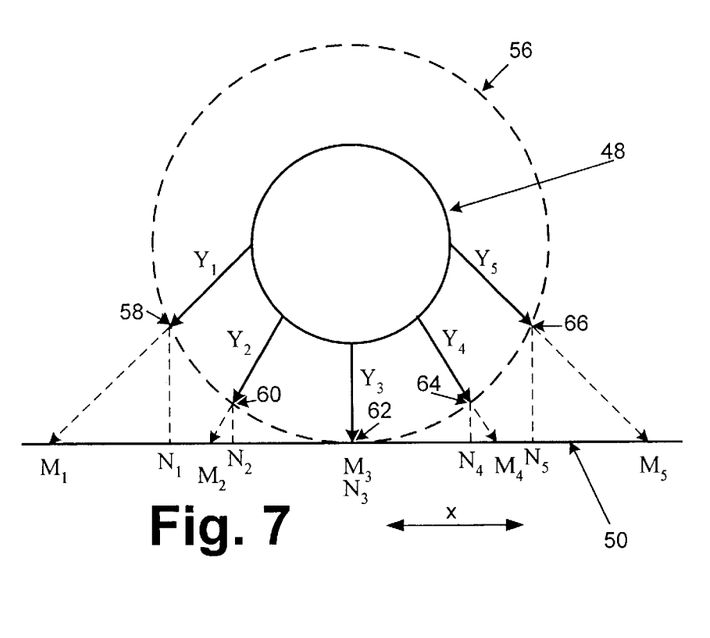
FIG. 7 is a schematic illustration of an ideal location of image data for one or more three-dimensional objects with respect to a planar surface provided by the invention.

In order to more fully understand how the system integrates all of the components to provide improved three-dimensional images, a graphical comparison between a conventional imaging process and the process of the invention is provided with reference to FIGS. 5, 6, and 7. In FIG. 5, an object or objects 48 is represented by a circle. In order to display an image of the object or objects 48 on a planar surface 50, image data for each of the image segments are projected by vectors $V_1$, $V_2$, $V_3$, $V_4$, and $V_5$ to the two-dimensional surface 50. For simplification, only projection of image data in the x direction on plane 50 is illustrated, however, it is understood that the image data have both x and y components for projection to surface 50. The length of the vectors $V_1$, $V_2$, $V_3$, $V_4$, and $V_5$ is equal to the distances the image data need to be from the surface 50 in order to simulate the contours of the object. As shown in FIG. 5, these distances vary for each image data point projected to surface 50 such that ($V_1$ and $V_5$)≠($V_2$ and $V_4$)≠($V_3$). Hence, the positioning of image data points on surface 50 in the x direction, represented by $M_1$, $M_2$, $M_3$, $M_4$, and $M_5$, respectively, is offset from an ideal position as discussed with reference to FIG. 7, thus introducing error or distortion into the resulting image.

Another way of looking at the image data which are combined to provide an image is that vector $V_3$ represents projection of an image data point to a focal point $M_3$. Ideally, all of the image data are projected to corresponding points $M_1$, $M_2$, $M_4$, and $M_5$ with the same size vectors as vector $V_3$. However, in order for the data points to be visible, they must intersect surface 50. For this to occur, the vectors for the image data $V_1$, $V_2$, $V_4$, and $V_5$ do not have the same length as vector $V_3$. Hence, the data points $M_1$, $M_2$, $M_4$, and $M_5$ are not in focus when the image file is reproduced in visible form using conventional techniques.

In order to provide more realistic three-dimensional images, the invention manipulates pixel data for the object or objects 48 as shown graphically in FIG. 6. According to the invention, as the object is rotated counter-clockwise, as shown by arrow 52, point 54 representing a pixel data point for the object moves from position A to position B. The change in angle with respect to reference line C is referred to as the angular velocity ($\omega_{xz}$) of the point 54. Angular velocity is used to represent the angle because the rate at which the angle changes as the object is rotated is related to the positioning of the pixel data point relative to an actual point on the object 48. For highly curved or contoured objects, the rate of change of the angle is greater than for less curved or contoured objects. In order to provide pixel data point placement in a data file so that the reproduced image more closely simulates an actual three-dimensional image, the relationship between the view angle ($\theta_v$) and the angular velocity ($\omega_{xz}$) is provided as described in more detail below.

The manipulation of the image data according to the invention, is represented graphically in FIG. 7. As will be seen, the invention provides a unique way to correct the image data so that all of the data points for the image will be substantially more in focus as compared to image data obtained using prior art techniques thereby improving image resolution. This manipulation also takes into account the properties of the lenticular material 10 as described above.

With reference to FIG. 7, the ideal positions for pixels for an image is along an arcuate path 56 corresponding to the contours of an object providing pixel data 58, 60, 62, 64, and 66. However, in order to view the image, the pixel data 58–66 are again projected to a two-dimensional plane 50 such as paper or other print media or a video monitor. In contrast to conventional techniques, pixel data 58, 60, 62, 64, and 66 lying on the arcuate path 56 are projected to the plane 50 to provide new data points $N_1$, $N_2$, $N_3$, $N_4$, and $N_5$, along the x direction of the two-dimensional plane 50. In this case, vectors $Y_1$, $Y_2$, $Y_3$, $Y_4$, and $Y_5$, representing the distance of the pixel data 58, 60, 62, 64, and 66 from object 48 along an arcuate path 56 have substantially equal lengths. This results in the projected data points $N_1$, $N_2$, $N_3$, $N_4$, and $N_5$, for the pixel data being substantially more in focus than if the pixel data were projected to data points $M_1$, $M_2$, $M_4$, and $M_5$.

Figure 8:
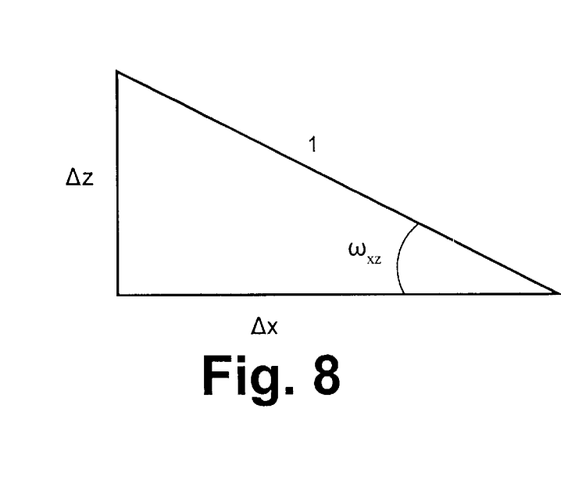
FIG. 8 is a schematic illustration of a relationship between changes in x and z coordinates of a pixel and angular movement of the pixel of one or more objects as the one or more objects are rotated.

Because the pixel placement provided by the invention is with respect to an arcuate path 56, the ideal position for each pixel point placement is shifted by an angle $\omega_{xz}$ which represents movement of a pixel point along the arcuate path 56 as the object is rotated as described above with reference to FIG. 6. The magnitude of the shift in the placement of the projected data point lying on the arcuate path 56 is represented by Δx (FIG. 8). The distance the pixel points on the arcuate path 56 are from the two-dimensional plane 50 is represented by the term Δz in FIG. 8. Accordingly, as the object 48 is rotated so that a pixel moves from pixel point 62 to pixel point 64 along the arcuate path 56, the projected pixel data placement on the two-dimensional plane 50 moves from data point $N_3$ to data point $N_4$ as shown in FIG. 7. The Δx and Δz dimensions for pixel placement are calculated from the angular velocity ($\omega_{xz}$) by the following equations:

$$\cos(\omega_x) = \Delta x/1 = \Delta x \qquad (I)$$

$$\sin(\omega_z) = \Delta z/1 = \Delta z \qquad (II)$$

The relationship between the angular velocity ($\omega_{xz}$) and the view angle $\theta_v$, may be determined by reference to FIGS. 7 and 9. The difference between placement positions $N_4$ and $M_4$ for pixel point 64 projected to plane 50 is defined as δΔx and represents an error in pixel positioning in the x direction using a traditional planar approach as compared to pixel placement provided by the invention.

With reference to FIGS. 5, 7, and 9, the difference between the length of vectors $V_4$ and $Y_4$ is δΔz. δΔz represents an error in pixel positioning in the z direction.

Referring to FIGS. 3 and 9, the view angle $\theta_v$ can be used to determine the magnitude of the error $\delta\Delta z$ between placement of a pixel point on the two-dimensional plane 50 using conventional techniques and placement of a pixel point on the arcuate path 56. The error $\delta\Delta z$ and the error $\delta\Delta x$ are related to the view angle $\theta_v$ according to the following equation, $$\sin(\theta_v) = \delta\Delta x / (\delta\Delta z). \tag{III}$$

for each view angle used. For each incremental view angle ($\Delta\theta_v$) selected, the relative view angle ($\theta_v$) is provided by the following equation:

$$\theta_v = n * \Delta\theta_v \tag{IV}$$

wherein n is the number of incremental view angles comprising the total view angle ($\theta_v$).

By using data points 58, 60, 62, 64, and 66 on arcuate path 56, each of the vectors $Y_1 \ldots Y_n$ have the same length. Hence, the errors $\delta\Delta x$ and $\delta\Delta z$ may be calculated from the formulas:

$$\delta\Delta x = \cos(\omega_{xz}) * Y_n \text{ and} \tag{V}$$

$$\delta\Delta z = \sin(\omega_{xz}) * Y_n. \tag{VI}$$

The foregoing relationships are used by the invention to build one or more objects from image data for the one or more objects. Accordingly, pixel data for the object or objects are modified for placement in a data file as described in more detail below. Each of the pixels P for the image 48 have coordinates (i,j). The x and z positions for each pixel $P_{ij}$ of the image generated by the invention are provided by the following equations:

$$x_v = i + \cos(n * \omega_{xij}) * d_{ij} \text{ and} \tag{VII}$$

$$z_v = j + \sin(n * \omega_{zij}) * d_{ij}, \tag{VIII}$$

wherein $x_v$ and $z_v$ are the x and z positions on the arcuate path 56 for pixels $P_{ij}$ n is number of incremental view angles selected, $\omega_{xij}$ and $\omega_{zij}$ are angular velocities for each pixel $P_{ij}$ as the object is rotated, and $d_{ij}$ is a depth shift factor in the z direction for each pixel relative to arcuate path 56 and plane 50.

Starting at a view angle of zero degrees and rotating the object relative to an initial starting position to simulate changes in the view angle as described with reference to FIGS. 3 and 6 above, the x and z coordinates are given by the following equations:

$$x_v = x_0 + \cos(\omega_{x\theta v}) * d_{ij} \text{ and} \tag{IX}$$

$$z_v = x_0 + \sin(\omega_{z\theta v}) * d_{ij} \tag{X}$$

The $\Delta x$ and $\Delta z$ values are calculated by the following equations:

$$\Delta x_v = x_0 + \cos(\omega_{x\Delta\theta v}) * d_{ij} \text{ and} \tag{XI}$$

$$\Delta z_v = x_0 + \sin(\omega_{z\Delta\theta v}) * d_{ij}, \tag{XII}$$

wherein $x_0$ and $z_0$ are the coordinates for pixels lying on planar surface 50 at a relative view angle of zero degrees ($\theta_v = 0$). In the general case, the x and z coordinates for all pixels is given by the following equations:

$$x_v = i + \cos(n * \omega_{xij}) * d_{ij} \text{ and} \tag{XIII}$$

$$z_v = j + \sin(n * \omega_{zij}) * d_{ij}, \tag{XIV}$$

wherein $\omega_{xij}$ and $\omega_{zij}$ are the angles for pixel placement on plane 50 using the ideal positions of the pixels on arcuate path 56.

Hence, the invention captures the smooth flow of image pixels projected from arcuate path 56 to plane 50. Accuracy of placement of the pixels on plane 50 can be improved by selecting smaller and smaller view angles $\theta_v$ or an increased number of incremental view angles up to a practical limit of view angles. However, the processing time for pixel positioning is increased as the view angle size is decreased or number of incremental view angles is increased.

By using the above techniques, the invention provides a method for manipulating image data from an image file to provide ideal locations for the pixel data on a two-dimensional viewing surface. Such pixel data are expected to be more in focus and thereby provide more realistic three-dimensional images. This improvement is believed to result primarily from a reduction of errors in pixel placement in the x and z directions.

Since the functions used by the invention are regular functions, i.e., (cos) and (sin), the $\Delta x$ and $\Delta z$ values do not have to have discrete values to provide pixel positioning data. Furthermore, the calculations can generally be performed on any pixel data provided in a wide variety of file formats to provide improved output resolution. A process 100 for application of the invention to an image data file to provide an improved three-dimensional image is provided in FIG. 10.

Figure 10:
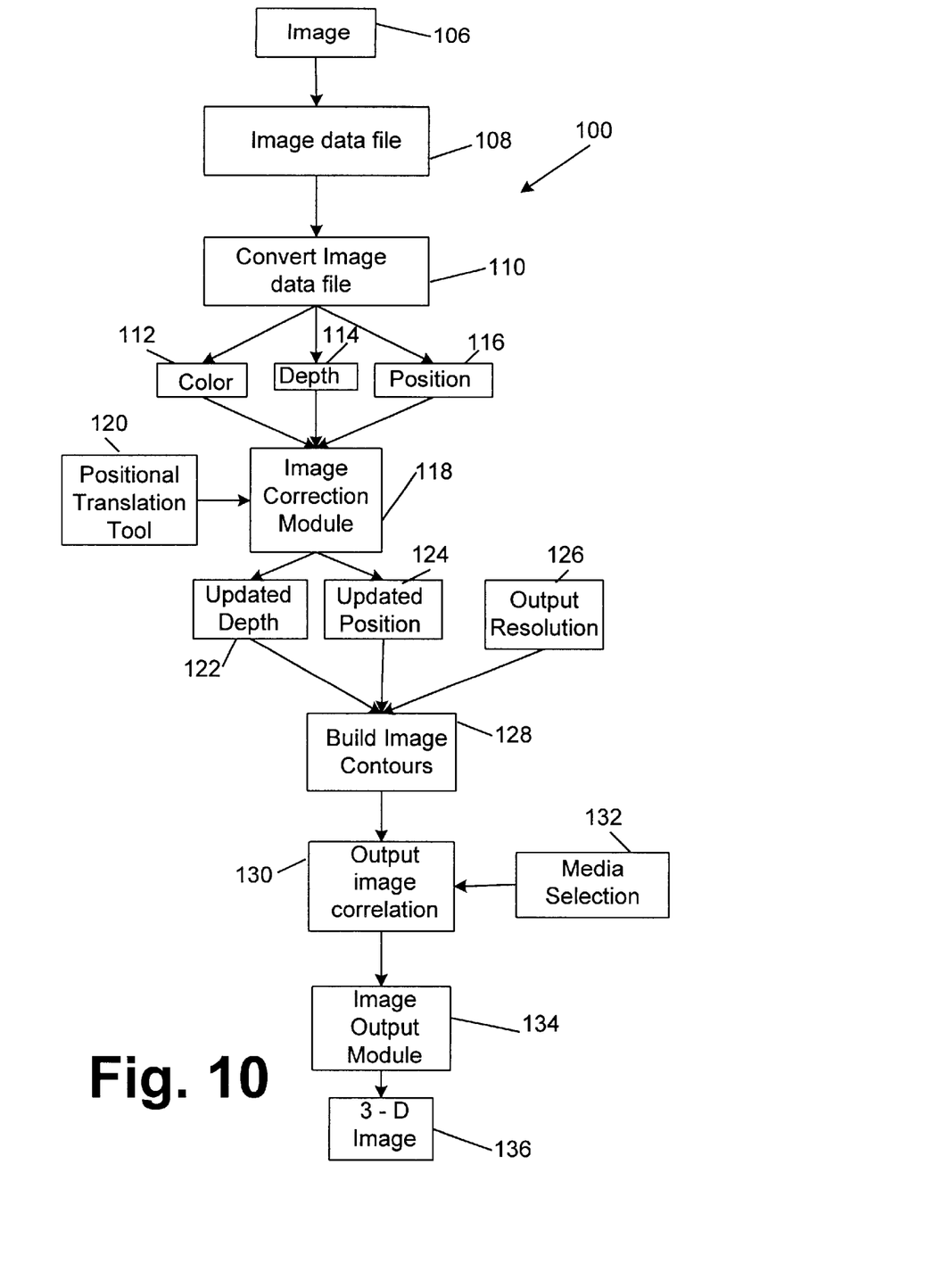
FIG. 10 is a block flow diagram of a method for converting image data into realistic three-dimensional image data.

Referring to the process 100, one or more images 106 of one or more objects is captured and converted to an image data file 108. Images may be captured by cameras or other input devices which provide image data in a wide variety of image data formats. The image 106 may be a two-dimensional or a three-dimensional image. For a two-dimensional image, additional depth simulation data may be manually inserted into the image data file 108 or interpolated from a series of image data files. Because the image data may be provided in a variety of file formats, the image data file 108 is input to an image conversion tool 110 which converts the image data file 108 into a useable format for the invention. Image formats which are compatible with the system 100 include, but are not limited to jpeg, tiff, bmp, pcx, png, and the like. The image conversion tool 110 provides parameters for each pixel of data by providing a memory map of the image 106. The memory map is reformatted into a standard internal memory file. The parameters provided by tool 110 for each pixel of data include color 112, depth/distance 114 from the object to a focal plane, and pixel position 116 relative to the object and to other pixels representing the object.

The color 112, depth/distance 114 and position 116 data is then input to an image correction module 118. The depth 114 and/or position 116 data input to the image correction module 118 are modified in the image correction module 118 based on the output from positional translation tool 120. Positional translation tool 120 calculates the pixel positions using the above equations I to XIV, particularly equation IV to determine the number of incremental view angles for the object or objects in the image. Next, equations XI and XII are used by positional translation tool 120 to provide $\Delta x$ and $\Delta z$, respectively for each pixel. Image correction module 118 integrates the positional translation data calculated by positional translation tool 120 to provide pixel position adjustments for each pixel in the image. More particularly, the pixel position adjustments calculated by equations XI and XII are used in equations XIII and XIV by module 118 to provide the x and z coordinates for each pixel in the pixel data file for the image. The output from the image correction module 118 includes updated depth 122 and updated position 124 parameters for each pixel.

The updated depth 122 and updated position 124 parameters and a desired output resolution 126 are then input into an image contour building tool 128 which actually builds image contours based on the updated image data provided by correction module 118. Tool 128 combines the color component of each pixel to provide image contours by mapping the updated depth 122 and updated position 124 with the desired output resolution 126 for each given depth. The mapping is conducted pixel by pixel, i.e., the color is assigned for each output pixel's $\Delta x$ and $\Delta z$ adjustment. Higher desired output resolution 126 provides for finer levels of visual distinction for each $\Delta x$ and $\Delta z$ adjustment, whereas, lower resolution output 126 results in visually combining $\Delta x$ and $\Delta z$ adjustments to provide effectively the same pixel positions. Hence, the image contours achieved by tool 128 provide pixel by pixel placement for the improved three-dimensional image based on the resolution 126 desired using the placement of pixel data along arcuate path 56, as set forth above.

After the image is built up, pixel by pixel, an image correlation module 130 integrates the improved image with a particular media defined by the selected substrate, ink composition, and lenticular material. Integration between the improved image and the media is highly dependant on the media selection 132 which is input to the module. As set forth above, the characteristics of the lenticular material 10 may be selected or modified to provide a wide variety of optical properties which enhance the improved image. Such characteristics include, but are not limited to lenticular frequency, lenticule shape, lenticule orientation, lenticule view angle, focal plane, material translucence, and the like.

Likewise, the ink composition may be selected or modified to provide desirable properties compatible with the substrate 22 and lenticular material 10 selected. For example, ink compositions may be selected to contain components which modify one or more ink properties. Such ink properties which may be modified include magnetic, refractive, and electrical properties and combinations thereof in order to enhance the three-dimensional image, or to provide encrypted images, phase shifted images, or polarized images.

The substrate 22 properties may also be selected based on the desired image characteristics for integration into the system by tool 130. The reflectivity, ink absorption, drying time, and the like of the substrate 22 provides parameters for the imaging process 100 which may be optimized for the improved image properties, ink composition and lenticular material 10 characteristics.

While the invention is particularly directed to three-dimensional imaging systems, the invention may be applied to a wide variety of media, including, but not limited to planar print media, lenticular viewing systems, electronic media, and the like. The image output module 134 also provides an image 136 which is highly dependent on the media selected for the image.

Figure 11:
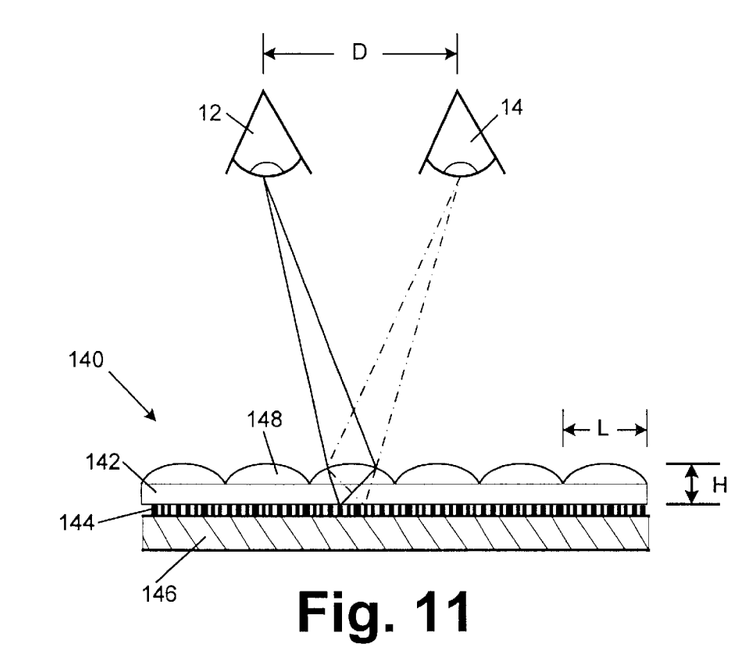
FIG. 11 is a cross-sectional view, not to scale, of a three-dimensional image device according to the invention.
Figure 12A:
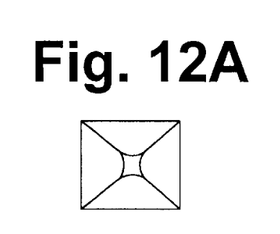
FIGS. 12A and 13A are plan views, not to scale of alternate lenticule designs for a lenticular material according to the invention.
Figure 12B:
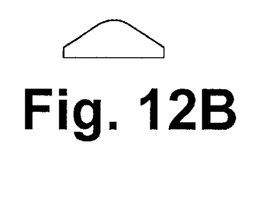
FIGS. 12B and 13B are side views, not to scale, of alternate lenticule designs for a lenticular material according to the invention.
Figure 13A:
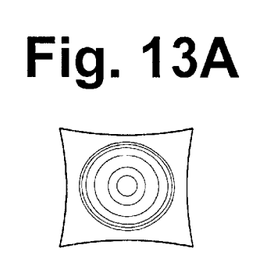
Figure 13B:
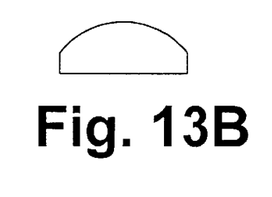

In a preferred embodiment, the media selected for providing a three-dimensional image is a lenticular viewing system 140 as shown in FIG. 11. The lenticular viewing system 140 includes a lenticular material 142, a three-dimensional image 144 provided by the image output module 134 described above and a support substrate 146 for the three dimensional image 144. In the case of a printed three-dimensional image 144, the support substrate may be selected from a wide variety of print media, including paper, plastic, metal, foil, film, and the like. In the case of an electronic image 144, the media may be a cathode ray tube (CRT), liquid crystal display (LCD), and the like.

Unlike the image 20 provided in a conventional lenticular viewing system 16 (FIG. 2), the image 144 provided by the invention is provided by pixels positioned according to their relationship to the object or objects as described above with reference to FIGS. 7 and 9. Hence, the image resolution is dependant on the pixel size rather than on the number of slices of two-dimensional images combined to provide a three-dimensional image.

Since the pixel size may be substantially smaller than the two-dimensional slices used in a conventional lenticular viewing system, the separation between the offset sets of images for viewing by the left and right eyes 12 and 14 may be substantially reduced. Reduction in the separation of the offset set of images enables the use of lenticules 148 having different shapes or lens characteristics. One characteristic of a lenticule 148 with respect to its optical properties is its aspect ratio. For the purposes of this invention, the "aspect ratio" is defined as the ratio of the diameter L of a semicircular lenticule 148 to the thickness H of the lenticular material 142 or maximum distance through the lenticular material 142 to the surface of the image 144 on the substrate 146. The greater the aspect ratio, L/H, the less material used and thus the lower the cost of the lenticular material 142. For example, a change in the aspect ratio may enable thinner lenticular material to be used. Because of the integration between the image and media, the invention enables optimization of the aspect ratio with respect to the image to improve image quality.

Aspect ratios for lenticular materials 142 typically range from about 0.3 to about 1.0 for lenses per inch (LPI) ranging from 6 to 200 and for material thicknesses ranging from about 0.010 inch to about 0.185 inch. The aspect ratio, L/H, is an important factor in the placement of the image pixels on the surface of the substrate 146 for a selected material thickness. Lower aspect ratios, L/H, for a given material thickness enable the individual offset image pixels to be spaced closer together. There is thus a practical limit to the aspect ratio, L/H, for a given material thickness considering manufacturing techniques and ability of the lenticular system 140 to provide the desired three-dimensional effect.

Nevertheless, the invention enables a wider variety of lenticular materials to be used since the offset sets of images may be combined by the system 100 in a variety of ways to obtain the desired results. For example, the lenticular material 142 may be comprised of elongate cylindrical lenticules as shown in FIG. 1 or the lenticules may be individual rectangular lenticules as illustrated in FIGS. 12A, 12B, 13A, and 13B. A lenticular system containing the lenticules illustrated in FIGS. 12A, 12B, 13A, and 13B enable viewing of the three-dimensional images from a wider variety of angles.

In summary, the invention enables independent manipulation of the image, lenticular material, ink composition, and substrate. With the above described process 100 and tools, the polarizability, refractive index, and other properties of the system may be selected on a molecular level to provide unique images, image systems, and image devices.

Having described various aspects and embodiments of the invention and several advantages thereof, it will be recognized by those of ordinary skills that the invention is susceptible to various modifications, substitutions and revisions within the spirit and scope of the appended claims.

What is claimed is:

1. A three-dimensional image device providing a three-dimensional image of one or more objects, the device comprising:

a base substrate;

an image layer on said substrate; and a lenticular material superposed on the image layer,
wherein the image layer is provided by an imaging tool configured for depositing pixels on the substrate from contour corrected pixel data derived from view angles external to the one or more objects such that the deposited pixels have a structural contour relationship to the one or more objects, and wherein the image layer is manipulated by the imaging tool to be compatible with the substrate and lenticular material.

2. The device of claim 1 wherein the image layer is provided by an ink composition selected for compatibility with the substrate and lenticular material to provide the three-dimensional image.

3. The device of claim 2 wherein the ink composition is comprised of components which modify one or more ink properties selected from the group consisting of magnetic, refractive, electrical, and combinations thereof in order to enhance the three-dimensional image.

4. The device of claim 3 wherein the imaging tool generates pixel data for pixels having x and z coordinates, wherein the x and z coordinates of the pixels in the image layer are a function of the corrected depth and pixel path components.

5. The device of claim 1 wherein the lenticular material is comprised of a material having a thickness and optical properties that are compatible with the substrate and image layer to provide the three-dimensional image.

6. The device of claim 1 wherein the pixel data includes color, depth, and positional components for each pixel.

7. The device of claim 1 wherein the contour corrected pixel data comprises pixel data having color, corrected depth and pixel path components.

8. The device of claim 1 wherein the lenticular material comprises a material selected from the group consisting of polycarbonate, polyester, polyethylene, polypropylene, polystyrene, polyethylene terephthalate, and modified copolymers of polyethylene terephthalate.

9. A method for producing three-dimensional images, the method comprising the steps of:
providing a digital image file from a digital image source of one or more objects, the digital image file containing pixel data for pixels having a structural contour relationship to the one or more objects;
converting the pixels to contour corrected pixels relative to view angles external to the one or more objects to provide a contoured image file;
building an output image file from the contoured image file;
selecting a printed image format, ink composition, lenticular material, and substrate for the contoured image file, wherein the printed image format provides pixel placement on the substrate for a three-dimensional image viewable through the lenticular material;
printing the three-dimensional image on the substrate to provide an image layer on the substrate; and
attaching the lenticular material to image layer on the substrate to provide a three-dimensional image.

10. The method of claim 9 wherein the digital image file comprises pixels having color, depth, and positional components.

11. The method of claim 9 wherein the contoured corrected pixels comprise color corrected depth and pixel path components.

12. The method of claim 9 wherein the three dimensional image comprises pixels having x and z coordinates, further comprising providing the x and z coordinates of the pixels in the three-dimensional image as a function of the corrected depth and pixel path components.

13. The method of claim 9 wherein the step of building an, output image file further comprises selecting an image resolution for the printed image as an input parameter to the step of building an output image file.

14. The method of claim 9 further comprising engineering an ink for printing the three-dimensional image to be compatible with the substrate and lenticular material.

15. The method of claim 14 wherein the ink is engineered by selecting components for the inks which give the inks properties selected from magnetic, refractive, electrical and combinations thereof to enhance the three-dimensional image.

16. The method of claim 9 wherein further comprising engineering the lenticular material by selecting a thermoplastic or thermoset material having thickness and optical properties compatible with the image layer and substrate.

17. The method of claim 16 further comprising manipulating one or more properties of the lenticular material selected from the group consisting of lenticular frequency, lenticule view angle, lenticule shape, lenticule orientation, lenticule focal plane, material translucence, and visual spectrum aberrations, to provide an enhanced three dimensional image.

18. An improved three-dimensional object comprising a three-dimensional image produced by the method of claim 17 and a lenticular material disposed on the three-dimensional image.

19. A three-dimensional image display system for displaying a three-dimensional image, the system comprising:
means for providing an image data file of one or more objects;
means for manipulating the image data file of one or more objects to assign image pixels from contour corrected pixel data derived from view angles external to the one or more objects such that the image pixels have a structural contour relationship to the one or more objects;
means for selecting an ink composition, substrate, and lenticular material compatible with the contour corrected pixel data; and
means for depositing an image containing the contour corrected pixel data on the substrate to provide a three-dimensional image layer.

20. The system of claim 19 wherein the image layer is provided by an ink composition selected for compatibility with the substrate and lenticular material to provide the three-dimensional image.

21. The system of claim 20 wherein the ink composition is comprised of components which modify one or more ink properties selected from the group consisting of magnetic, refractive, electrical, and combinations thereof in order to enhance the three-dimensional image.

22. The system of claim 19 wherein the lenticular material is comprised of a material having a thickness and optical properties that are compatible with the substrate and image layer to provide the three-dimensional image.

23. The system of claim 19 wherein the contour corrected pixel data comprises pixel data having color, corrected depth and pixel path components.

24. The system of claim 23 wherein the means for manipulating the image data file generates pixel data for pixels having x and z coordinates, wherein the x and z coordinates of the pixels in the three-dimensional image are a function of the corrected depth and pixel path components.

* * * * *